United States Patent
Yatsu et al.

(10) Patent No.: US 6,869,184 B2
(45) Date of Patent: Mar. 22, 2005

(54) POLARIZED-LIGHT CONVERTING UNIT AND PROJECTOR USING THE SAME

(75) Inventors: Masahiko Yatsu, Fujisawa (JP); Koji Hirata, Yokohama (JP); Naoyuki Ogura, Machida (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/671,880

(22) Filed: Sep. 29, 2003

(65) Prior Publication Data
US 2004/0105150 A1 Jun. 3, 2004

(30) Foreign Application Priority Data
Nov. 15, 2002 (JP) ........................................ 2002-331531

(51) Int. Cl.[7] .............................................. G03B 21/14
(52) U.S. Cl. ............................. 353/20; 353/33; 359/490
(58) Field of Search ............................... 353/20, 31, 33, 353/34, 81; 349/5, 7, 8, 9; 359/490, 497, 501

(56) References Cited

U.S. PATENT DOCUMENTS 6,176,586 B1 * 1/2001 Hirose et al. ................. 353/31
6,343,864 B1 * 2/2002 Tajiri ............................ 353/20
6,525,785 B2 * 2/2003 Shiue ............................ 349/9
6,678,015 B2 * 1/2004 Yi et al. ..................... 348/782

FOREIGN PATENT DOCUMENTS

| JP | P2001-42124 A | 2/2001 |
| JP | P2001-318426 A | 11/2001 |

* cited by examiner

Primary Examiner—William C. Dowling
(74) Attorney, Agent, or Firm—McDermott Will & Emery LLP

(57) ABSTRACT

Disclosed is a polarized-light converting unit, which is excellent in contrast performance and realizes high reliability and an increase in its life, and a projector device using the converting unit. The polarized-light converting unit includes first and second polarizing beam splitters provided in an integral form. The first polarizing beam splitter includes two incident planes on which two types of color light are respectively incident. The second polarizing beam splitter includes both a ¼-wave plate and first dichroic mirror, and a ¼-wave plate and a second dichroic mirror, both of which are disposed on two adjacent surfaces different from a junction surface with the first polarizing beam splitter and an outgoing surface thereof.

15 Claims, 17 Drawing Sheets

POLARIZED-LIGHT CONVERTING UNIT AND PROJECTOR USING THE SAME

BACKGROUND OF THE INVENTION

1. Field of the Invention

The present invention relates to a liquid crystal projector using a liquid crystal panel. The liquid crystal projector can be widely used in the field of the so-called liquid crystal projector of frontal projection type, and a projection type television.

2. Description of the Related Art

A liquid crystal projector for business purposes is widely becoming pervasive. A projection type television using liquid crystal display elements has been developed as an alternative to an image display device of such a type that an image displayed on a conventional cathode ray tube is projected onto the screen. In particular, a home projection type television has been required to have more faithful color reproducibility, high contrast performance and quick moving-picture display performance as compared with the business liquid crystal projector.

Since light passes through a liquid crystal layer by reflection twice back and forth in the case of each of liquid crystal light valves, the thickness of the liquid crystal layer can be formed about half as compared with a transmissive type. With the formation of about half thickness of the liquid crystal layer, its response speed results in four times. As a liquid crystal projector to which reflection type light valves are applied, there has been known a configuration disclosed in, for example, Japanese Patent Laid-open No. 2001-318426.

SUMMARY OF THE INVENTION

A color separation/synthesis system having a configuration similar to a color separation/synthesis system (corresponding to an optical system from a first dichroic mirror 3 to a dichroic prism 5 shown in FIG. 1 in the same publication) disclosed in the same publication, is shown in FIG. 17.

Referring to FIG. 17, reference numeral 11 designates a light source, 12 designates a reflector, and 13 and 14 designate a first multilens array and a second multilens array, respectively, used as a lens array type integrator. Reference numeral 32 designates a flat plate type polarized-light converting means comprising a multi prism array, 15 designates a focusing lens, 16 designates a focusing condenser lens, 17 designates a sixth dichroic mirror, 18, 19, and 20 designate polarizing beam splitters, 21 and 23 designate flat plate glasses, 22 designates a partial polarization rotating element for converting a polarized state of color light (R light in this case) in a specific wavelength band by P-polarization and S-polarization, 33 designates a partial polarization rotating element for converting a polarized state of color light (B light in this case) in a specific wavelength band by P-polarization and S-polarization, 24, 25 and 26 designate reflection type light valves, and 34 designates a total reflection mirror.

Referring to FIG. 17, a light flux or bundle emitted from the light source 11 results in a light bundle which is reflected by the reflector 12 having a parabolic shape and parallel to an optical axis. The quality of light on each lens cell of the first multilens array 13 is superimposed on an effective surface of each of the reflection type light valves 24, 25 and 26 under the operations of the second multilens array 14 and the focusing lens 15, so that the uniformity of a quality-of-light distribution is improved. Incidentally, the natural light is aligned in its polarizing direction to, for example, S-polarized light (hereinafter S-polarized light rays are indicated by solid lines) by the flat plate type polarized-light converting means disposed following the second multilens array 14. The light passes through the focusing lens 15 and is turned by the total reflection mirror 34, followed by entering into the condenser lens 16. The condenser lens 16 performs the action of making main light rays parallel, i.e., bringing the same into telecentric form.

Of the white light aligned to the S-polarized light, R and B light is reflected by the sixth dichroic mirror 17 and G light penetrates the sixth dichroic mirror 17.

Since the R light reflected by the sixth dichroic mirror 17 is of an S-polarized light bundle, it penetrates the partial polarization rotating element 33 and is thereafter reflected by a polarization separating surface of the polarizing beam splitter 18 and enters into the reflection type light valve 24 for R. The light reflected from the reflection type light valve 24 makes a substitute of its polarized state in an ON state and thereby turns into the S-polarized light (hereinafter P-polarized light rays are indicated by dotted lines). Therefore, next, the light penetrates the polarizing beam splitter 18 and penetrates the flat plate glass 21, after which it is converted into S-polarized light by the partial polarization rotating element 22 for rotating the polarized state of the R light by P-polarization and S-polarization, which in turn is reflected by a polarization separating surface of the polarizing beam splitter 20, followed by being launched into a projection lens (not shown).

Since the G light that has transmitted through the sixth dichroic mirror 17 is of an S-polarized light bundle, it is reflected by a polarization separating surface of the polarizing beam splitter 19 and applied to the reflection type light valve 25 for G. The light reflected from the reflection type light valve 25 makes a substitute of its polarized state in an ON state and thereby turns into the P-polarized light. Therefore, next, the light penetrates the polarizing beam splitter 19 and penetrates the flat plate glass 23. Further, the light penetrates the polarization separating surface of the polarizing beam splitter 20 and enters the projection lens (not shown).

Since the B light reflected by the sixth dichroic mirror 17 is of an S-polarized light bundle but is converted into P-polarized light by the partial polarization rotating element 33, it penetrates the polarization separating surface of the polarizing beam splitter 18 and is emitted to the reflection type light valve 26 for B. Since the light reflected from the reflection type light valve 26 makes a substitute of its polarized state in an ON state and thereby turns into the S-polarized light. Therefore, next, the light is reflected by the polarizing beam splitter 18 and penetrates the flat plate glass 21 and the partial polarization rotating element 22. Then it is reflected by the polarization separating surface of the polarizing beam splitter 20 and enters the projection lens (not shown).

An optical path between the sixth dichroic mirror 17 and the polarizing beam splitter 20 is generally called a color separation/synthesis system because it performs color separation and synthesis of color light.

The explanatory diagram of FIG. 17 and the configurational diagram of the color separation/synthesis system disclosed in Japanese Patent Application No. 2001-318426 are different in position of each color reflection type light valve but identical in configuration in that the color light is separated into one color and two colors by the dichroic mirror and the two partial polarization rotating elements are disposed on the associated optical paths for the two colors.

Meanwhile, since the partial polarization separating element has an organic layer in its structure, it is unfit for an illumination optical system large in the quantity of light and a household projection type TV that needs a long life, etc. Even if the partial polarization rotating element or the like is cooled by cooling means, the household projection type TV involves a problem in terms of noise of a fan where the fan is used in the cooling means. It is thus desirable to remove the partial polarization rotating element 33 disposed at a position close to the light source 11 and high in temperature.

A first object of the present invention is to provide a polarized-light converting means capable of realizing high reliability/increase in life by removing one sheet of partial polarization rotating element disposed at a position close to a light source and high in temperature, and a projector device using the same.

Another object of the present invention is to provide a polarized-light converting means excellent in contrast performance and a projector using the same.

In order to solve the above problems, according to an aspect of the present invention, there is provided a polarized-light converting unit which includes first and second polarizing beam splitters joined in a columned form or shaped in an integrated prism form. The first polarizing beam splitter includes two incident planes on which two types of color light separated into color light of a specific wavelength band from white light and color light of the remaining wavelength band from the while light are respectively incident. The second polarizing beam splitter is provided with both a ¼-wave plate and a first dichroic mirror, and a ¼-wave plate and a second dichroic mirror different in wavelength characteristic from the first dichroic mirror, both of which are respectively disposed on two adjacent surfaces different from a junction surface with the first polarizing beam splitter and an outgoing surface thereof.

Owing to the configuration of the polarized-light converting unit in this way, if, for example, the two types of color light are defined as B light and R light/G light, then the B light and R light/G light emitted from the polarized-light converting unit are different from each other in polarizing direction. Therefore, the partial polarization rotating element 33 necessary to separate the R light and B light in the color separation/synthesis system described in FIG. 17 becomes unnecessary.

DETAILED DESCRIPTION OF THE PREFERRED EMBODIMENTS

Figure 1:
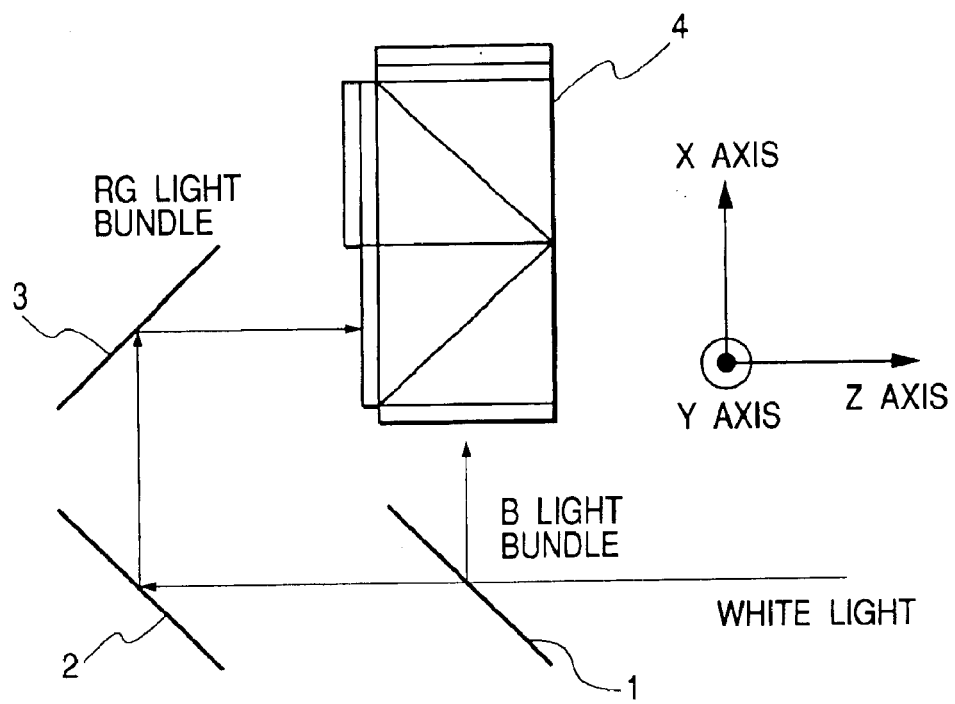
FIG. 1 is a configurational diagram of an essential part including a polarized-light converting means according to a first embodiment of the present invention.
Figure 2:
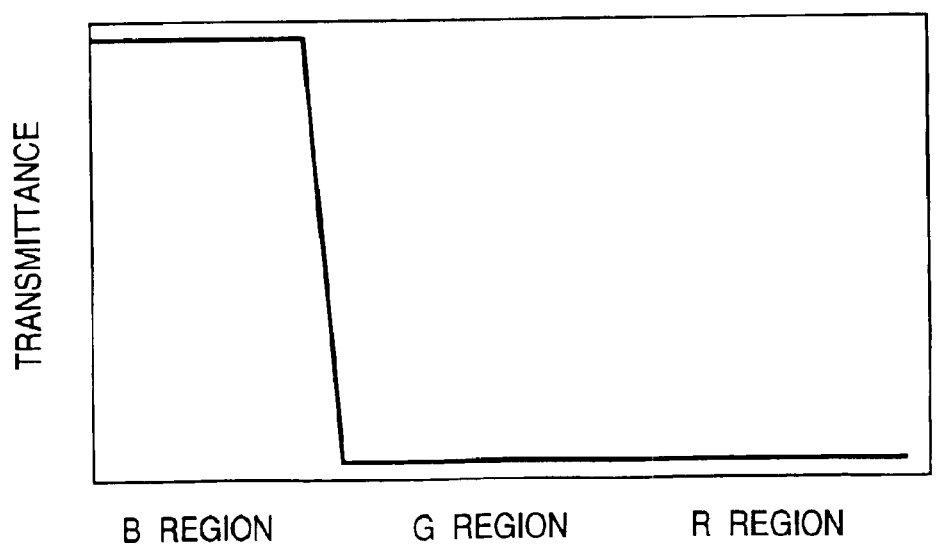
FIG. 2 is a characteristic diagram showing spectral transmittance of a second dichroic mirror employed in the first embodiment of the present invention.

A polarized-light converting means according to an embodiment of the present invention will be explained below with reference to FIGS. 1 through 15. In addition, a projector using the polarized-light converting means of the present invention will be explained below with reference to FIG. 16. Incidentally, common parts in the drawings are respectively identified by the same reference numerals, and those described once will be omitted from their common description subsequent to their first description.

A configuration of a polarized-light converting means illustrative of one embodiment of the present invention will first be described using FIG. 1. Referring to FIG. 1, reference numeral 1 denotes a first dichroic mirror used as a color separation means, 2 and 3 denote total reflection mirrors, and 4 denotes a polarized-light converting means.

Referring to FIG. 1, white light emitted from a light source 11 and a reflector 12 (to be described later in an explanatory diagram of a projector device shown in FIG. 16) is color-separated by the first dichroic mirror 1, i.e., the color separation means such that a B light bundle is reflected by the first dichroic mirror 1, and an R light bundle and a G light bundle pass through the same. The reflected B light bundle is directly incident on the polarized-light converting means 4. The transmitted R light bundle and G light bundle pass through the total reflection mirrors 2 and 3 and are then incident on the polarized-light converting means 4 through different openings.

In order to facilitate the subsequent description, a right coordinate system is now introduced for convenience, wherein as shown in FIG. 1, the direction of an optical axis of R and G light bundles incident on the polarized-light converting means 4 is set as a Z axis, the direction of an optical axis of a B light bundle incident on the polarized-light converting means 4 is set as an X axis, and the direction extending from the back of the sheet of FIG. 1 to the front side thereof is set as a Y axis.

Figure 3:
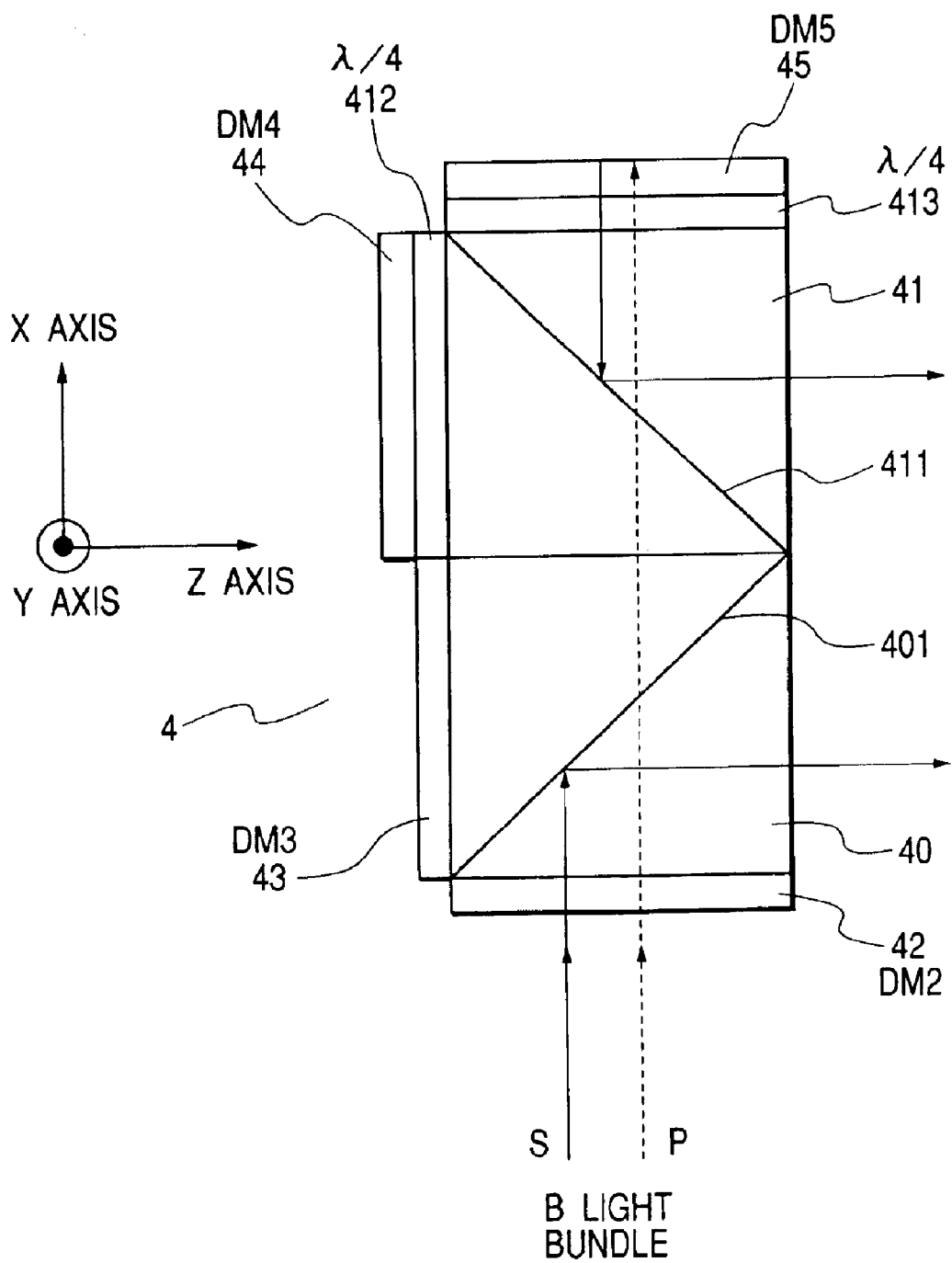
FIG. 3 is a diagram illustrating the operation of the polarized-light converting means with respect to a B light bundle, according to the first embodiment of the present invention.

A basic configuration of the polarized-light converting means 4 according to the embodiment of the present invention, and the operations of the polarized-light converting means 4 and a color separation/synthesis system with respect to the B light bundle will next be explained using FIGS. 2 through 9. FIG. 3 is a diagram showing the operation of the polarized-light converting means with respect to the B light bundle. Optical paths of a P-polarized B light bundle and an S-polarized B light bundle will be described with reference to FIG. 3.

Referring to FIG. 3, reference numeral 40 designates a first polarizing beam splitter, 401 designates a polarization separating surface of the first polarizing beam splitter 40, 41 designates a second polarizing beam splitter, 411 designates a polarization separating surface of the second polarizing beam splitter 41, 412 and 413 designate ¼-wave plates, 42 designates a second dichroic mirror, 43 designates a third dichroic mirror, 44 designates a fourth dichroic mirror, and 45 designates a fifth dichroic mirror.

The polarized-light converting means 4 comprises the first prism-shaped polarizing beam splitter 40 and the second prism-shaped polarizing beam splitter 41 both stacked in a columned form in the X-axis direction. The polarization separating surface 401 of the first polarizing beam splitter 40 and the polarization separating surface 411 of the second polarizing beam splitter 41 are orthogonal to each other, and surfaces on the cross-line side in which the polarization separating surfaces 401 and 411 intersect at right angles are defined as outgoing surfaces.

The first polarizing beam splitter 40 is provided with dichroic mirrors for selecting color light of a predetermined wavelength band and allowing it to pass therethrough at the associated two adjacent surfaces thereof on which two types of color light (B light bundle and R light bundle/G light bundle in the present embodiment) of wavelength bands different from each other are respectively incident. In the present embodiment, a dichroic mirror provided on the surface on which the B light bundle is incident corresponds to the second dichroic mirror for selecting the B light bundle and causing it to pass therethrough, whereas a dichroic mirror provided on the surface on which the R light bundle/G light bundle are incident corresponds to the third dichroic mirror for cutting a luminescent line of about 580 nm (yellow) between the wavelength bands of the G light bundle and the R light bundle.

The second polarizing beam splitter 41 is provided with a ¼-wave plate and a dichroic mirror for selecting color light with different predetermined wavelength bands and reflecting the same, in this order, at each of the two adjacent surfaces thereof different from the stacked surface and outgoing surface of the first polarizing beam splitter 40. In the present embodiment, a ¼-wave plate on the surface side opposite to the surface on which the B light bundle is incident, of the surfaces adjacent to each other, corresponds to the ¼-wave plate 413, whereas the dichroic mirror for reflecting the B light bundle corresponds to the fifth dichroic mirror 45. A ¼-wave plate on the other surface side corresponds to the ¼-wave plate 412, whereas a dichroic mirror for reflecting the R light bundle/G light bundle corresponds to the fourth dichroic mirror 45.

Since the first dichroic mirror 1 is disposed at an diagonal 45° with respect to the natural light as apparent from FIG. 1, the rise of a half-value wavelength with respect to the whole natural light cannot be made steep due to the difference between a half-value wavelength relative to P polarization and a half-value wavelength relative to S polarization. Therefore, the second dichroic mirror 42 is caused to have a spectral transmittance characteristic of FIG. 2 and the function of making steep the boundary between the B light bundle and the G light bundle.

Figure 4:
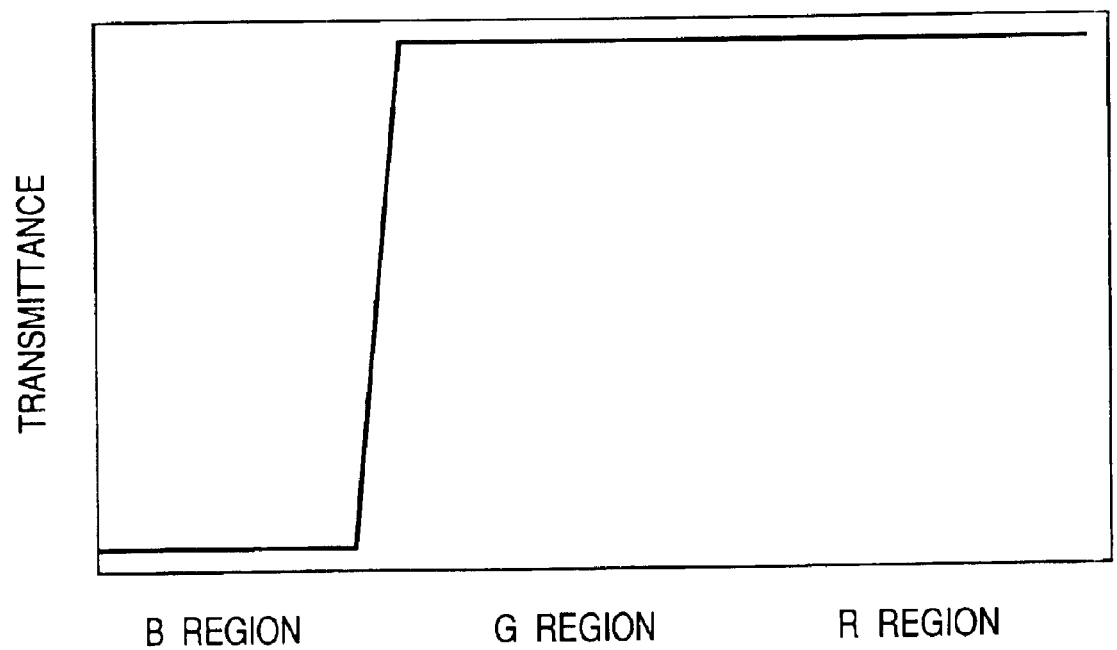
FIG. 4 is a characteristic diagram of spectral transmittance of a fifth dichroic mirror employed in the first embodiment of the present invention.

A P-polarization component (indicated by a dotted line) of the B light bundle incident from the lower side of the sheet of FIG. 3 to the polarized-light converting means 4 passes through the second dichroic mirror 42 described above. Thereafter, it penetrates the polarization separating surface 401 of the first polarizing beam splitter 40 and enters the second polarizing beam splitter 41. Similarly, the P-polarization component penetrates even the polarization separating surface 411 of the second polarizing beam splitter 41 and passes through the ¼-wave plate 413, followed by entering the fifth dichroic mirror 45. Meanwhile, the spectral transmittance characteristic of the fifth dichroic mirror 45 is caused to have a spectral transmittance characteristic in which only a B light bundle is reflected as shown in FIG. 4. The B light bundle is reflected by the fifth dichroic mirror 45 and passes through the ¼-wave plate 413 again. Since the ¼-wave plate 413 has a polarization axis in a 45° direction, it penetrates the ¼-wave plate 413 twice back and forth. Consequently, the ¼-wave plate 413 has an operation identical to a ½-wave plate, i.e., the action of converting P-polarized light to S-polarized light. Thus, the B light bundle is reflected by the polarization separating surface 411 of the second polarizing beam splitter 41 this time and is outputted to the right side as viewed in the drawing as the S-polarized light (indicated by a solid line).

An S-polarization component (indicated by the solid line) of the B light bundle passes through the second dichroic mirror 42, after which it is reflected by the polarization separating surface 401 of the first polarizing beam splitter 40 and outputted to the right side as viewed in the drawing with remaining as the S-polarized light. Namely, the B light bundle is all turned into the S-polarized light and emitted from the polarized-light converting means 4.

Figure 5:
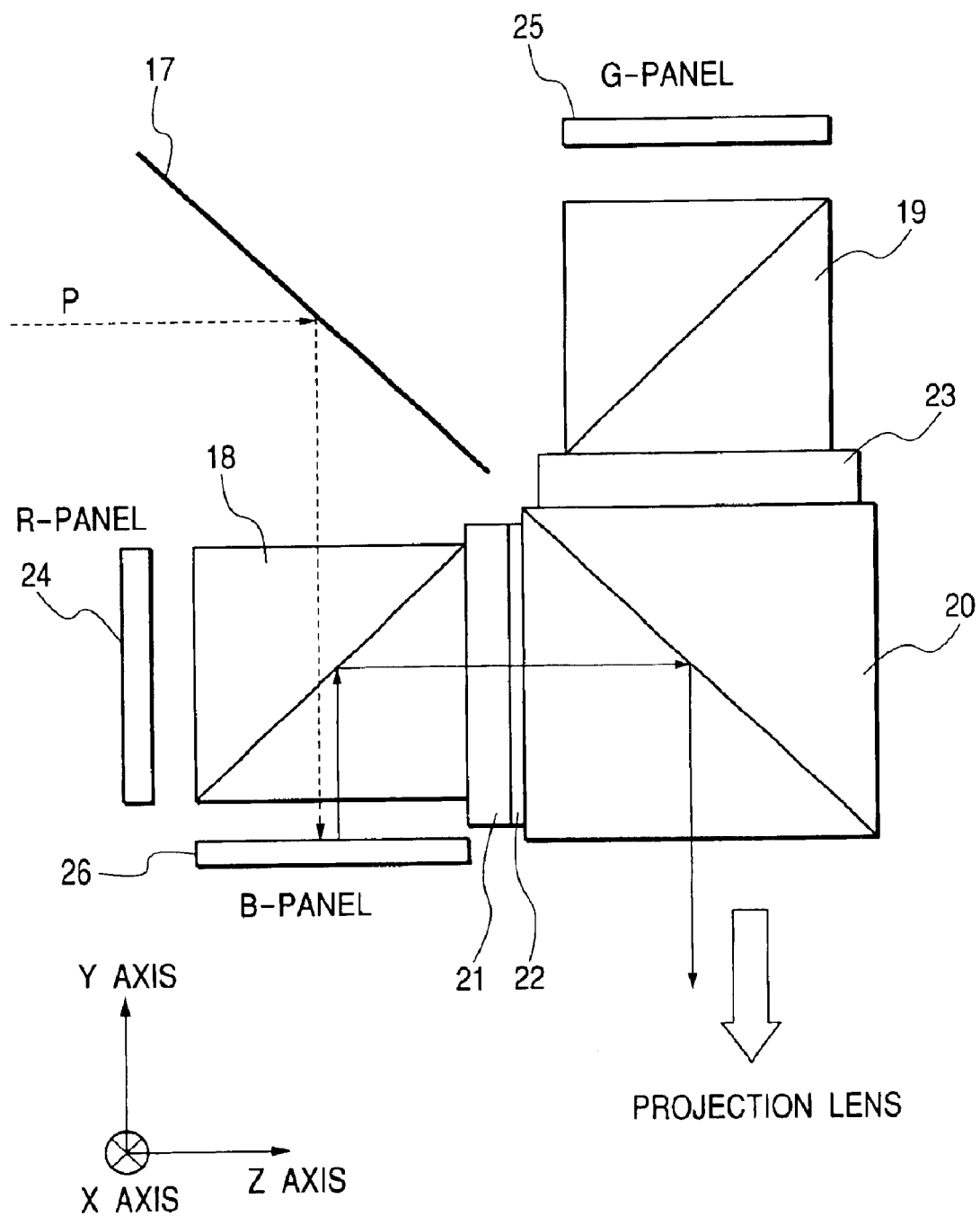
FIG. 5 is a diagram showing the operation of a color separation/synthesis system with respect to the B light bundle, which is employed in the first embodiment of the present invention.

The operation of the color separation/synthesis system according to the present invention with respect to the B light bundle emitted from the polarized-light converting means 4 will next be explained using FIG. 5. FIG. 5 shows the color separation/synthesis system according to the present invention from which a partial polarization rotating element 33 close to a light source is omitted from a color separation/synthesis system of FIG. 17. In FIG. 5, the functions of the components are identical to those shown in FIG. 17, and the description of their functions will therefore be omitted.

Now, in the polarized-light converting means 4 shown in FIG. 1, a light flux size on the incident side is substantially square, whereas a light flux size on the outgoing side becomes long sideways in the form of an aspect ratio of 1:2 (R light bundle/G light bundle will be described later) as described in the B light bundle in FIG. 3. That is, for the F value of an illumination optical system, the F value in the horizontal direction (direction parallel to an XZ plane) results in a value equivalent to about one-half the F value in the vertical direction (direction perpendicular to the XZ plane, i.e., Y-axis direction). On the other hand, as to degradation of a polarization separating characteristic of a polarizing bean splitter where the angle of an incident light beam is shifted from a reference angle, characteristic degradation in a flat or plane surface (i.e., incident surface or plane of polarization separating surface. The incident plane described here is defined by the direction of propagation of the incident light and the normal of a boundary surface. However, the direction of propagation thereof is defined by the optical axis even in the case of a light flux having an angular distribution at an F value.) including the normal of the polarization separating surface to the optical axis is large as compared with characteristic degradation at a flat surface orthogonal to its surface. Therefore, the polarized-light converting means 4 shown in FIG. 1 is configured in the form of an XZ section and the color separation/synthesis system shown in FIG. 5 is configured in the form of a YZ section, in such a manner that the light flux emitted from the polarized-light converting means in the horizontal direction (i.e., parallel to the incident plane of the polarization separating surface) enters parallel to the surface orthogonal to the incident plane of the polarization separating surface of the color separation/synthesis system. That is, the light flux emitted from the polarized-light converting means 4 as the P-polarized light has its polarization direction parallel to the XZ plane and enters in parallel to the surface orthogonal to the incident plane of the polarization separating surface of each of polarizing beam splitters 18, 19 and 20 of the color separation/synthesis system shown in FIG. 5. Therefore, the light flux is launched into the color separation/synthesis system as S-polarized light. In reverse, the light flux emitted from the polarized-light converting means 4 shown in FIG. 1 as the S-polarized light enters the color separation/synthesis system of FIG. 5 as P-polarized light.

It should be apparent that the relationship in which the incident plane of the polarization separating surface of the above polarized-light converting means 4 and the incident plane of the polarization separating surface of the color separation/synthesis system are orthogonal to each other, may be established where the direction of the incident plane of the polarization separating surface of the polarized-light converting means 4 is converted into an incident light entrance of the color separation/synthesis system. When the illumination optical system including the polarized-light converting means is folded three-dimensionally by a mirror or the like, for example, the incident plane of the polarization separating surface of the polarized-light converting means 4 when the illumination optical system is seen from the incident light entrance of the color separation/synthesis system, and the incident plane of the polarization separating surface of the color separation/synthesis system may hold an orthogonal relation.

Meanwhile, the relationship of position between the polarized-light converting means 4 shown in FIG. 1 and the color separation/synthesis system shown in FIG. 5 is established as it is even if it is rotated 90° to substitute horizontal/vertical relations with each other. However, the thickness of a prism constituting the color separation/synthesis system can be made thin by allowing a separating direction of the color separation/synthesis system of FIG. 5 to coincide with a vertical direction (short side) of a reflection type light valve. At this time, the coordinate systems shown in FIGS. 1 and 5 have been adopted because an advantage is brought about in that ① a reduction in double refraction at the polarizing beam splitter is achieved and ② a back focus can be reduced, thereby bringing about an advantage in reducing the size of a projection lens.

Referring back to FIG. 5, the B light bundle emitted from the polarized-light converting means 4 in the form of the S-polarized light enters the color separation/synthesis system as the P-polarized light. Incidentally, since the B light bundle as seen at the entrance of the color separation/synthesis system is of P-polarized light (R light bundle/G light bundle: S-polarized light. The details thereof will be described later), the partial polarization rotating element 33 for changing the polarizing direction of a blue light bundle shown in FIG. 17 as in the prior art becomes unnecessary.

The B light bundle is reflected by a sixth dichroic mirror 17 and enters a polarizing beam splitter 18. The B light bundle corresponding to the P-polarized light penetrates a polarization separating surface of the polarizing beam splitter 18 and is incident on a reflection type light valve 26 for B. The light reflected from the reflection type light valve 26 makes a substitute of its polarized state in an ON state and is hence turned into the S-polarized light. Therefore, the light is reflected by the polarization separating surface of the polarizing beam splitter 18 and penetrates a flat plate glass 21 and a partial polarization rotating element 22 for rotating a polarized state of R light by P-polarization and S-polarization. Further, the light is reflected by a polarization separating surface of a polarizing beam splitter 20 and enters a projection lens (not shown).

Leakage light of the B light bundle at the polarized-light converting means 4 will next be explained using FIGS. 6 and 7. The leakage light of the B light bundle at a polarization separating surface 401 of a first polarizing beam splitter 40 will first be explained using FIG. 6.

The leakage light corresponding to P-polarized light of the B light bundle at the first polarizing beam splitter 40 is reflected by the polarization separating surface 401 of the first polarizing beam splitter 40 and outputted to the right side as viewed in the drawing as P-polarized light. The leakage light corresponding to S-polarized light of the B light bundle at the first polarizing beam splitter 40 penetrates the polarization separating surface 401 of the first polarizing beam splitter 40 and enters into a second polarizing beam splitter 41. Since the leakage light is of the S-polarized light, it is reflected by a polarization separating surface 411 of the second polarizing beam splitter 41 and penetrates a ¼-wave plate 412, followed by being launched into a fourth dichroic mirror 44. Since the leakage light is outputted to the left as viewed in the drawing by allowing the fourth dichroic mirror to have a characteristic for causing the B light bundle to pass and reflecting a G light bundle and an R light bundle, like a spectral transmittance characteristic shown in FIG. 8, no problem occurs.

The leakage light of the B light bundle at the polarization separating surface 411 of the second polarizing beam splitter 41 will next be explained using FIG. 7.

P-polarized light of the B light bundle transmitted through the polarization separating surface 401 of the first polarizing beam splitter 40 originally penetrates the polarization separating surface 411 of the second polarizing beam splitter 41 but the leakage light is reflected by the polarization separating surface 411. Since the leakage light penetrates a ¼-wave plate 412 and a fourth dichroic mirror 44 and is outputted to the left side as viewed in the drawing in a manner similar to the previous description, no problem arises.

Figure 6:
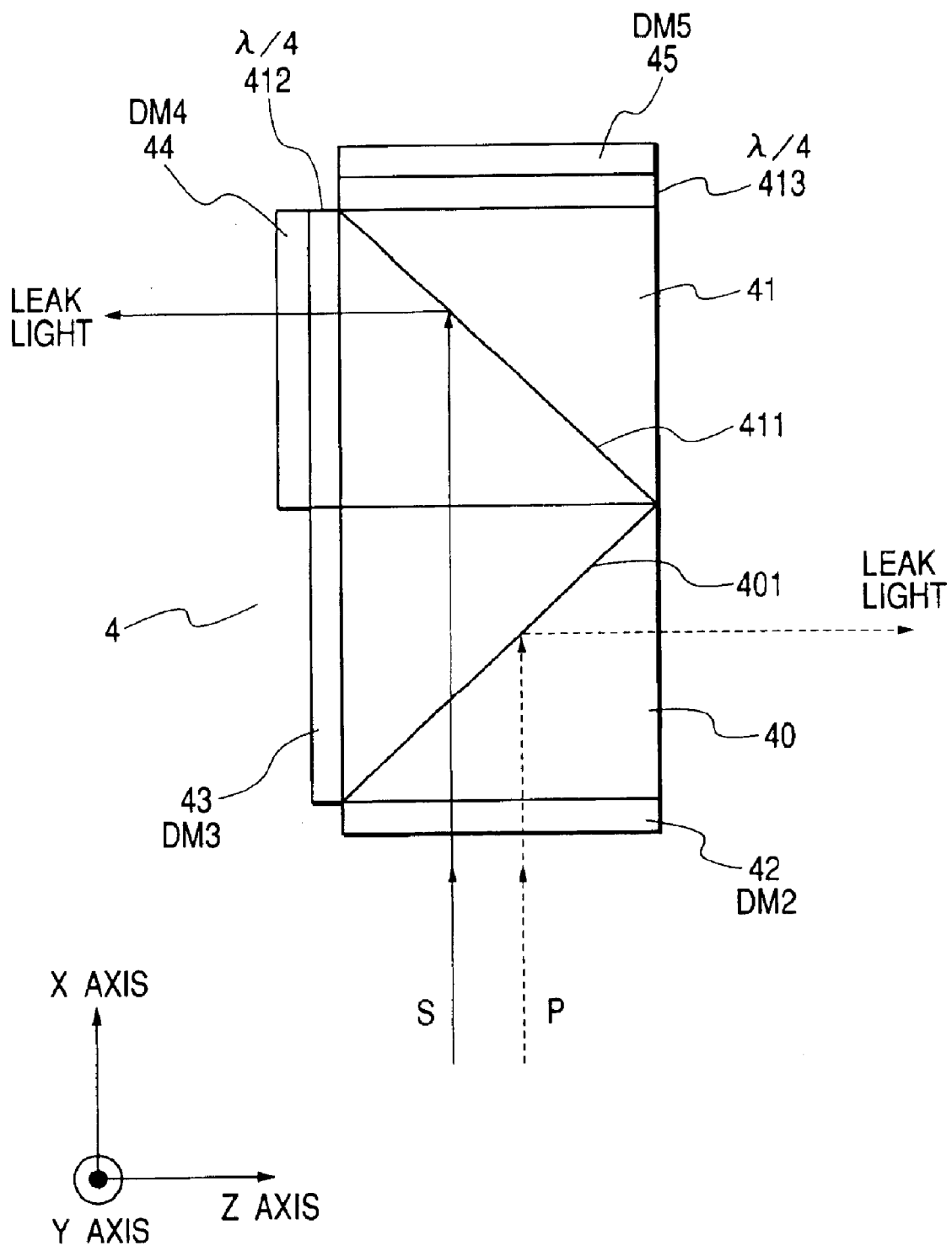
FIG. 6 is a diagram illustrating the operation of the polarized-light converting means with respect to leakage light of the B light bundle at a first polarizing beam splitter employed in the first embodiment of the present invention.
Figure 7:
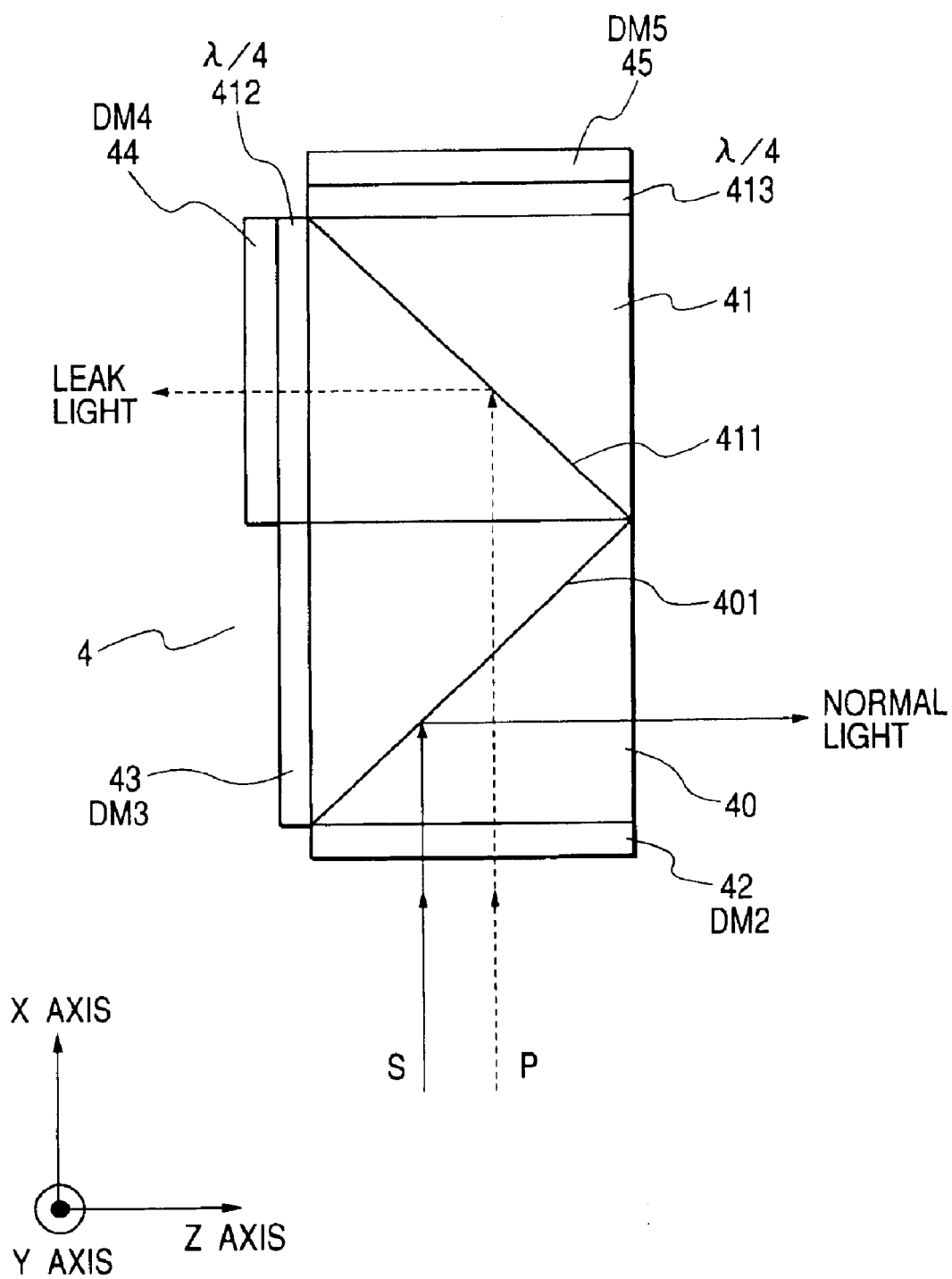
FIG. 7 is a diagram showing the operation of the polarized-light converting means with respect to leakage light of the B light bundle at a second polarizing beam splitter employed in the first embodiment of the present invention.
Figure 8:
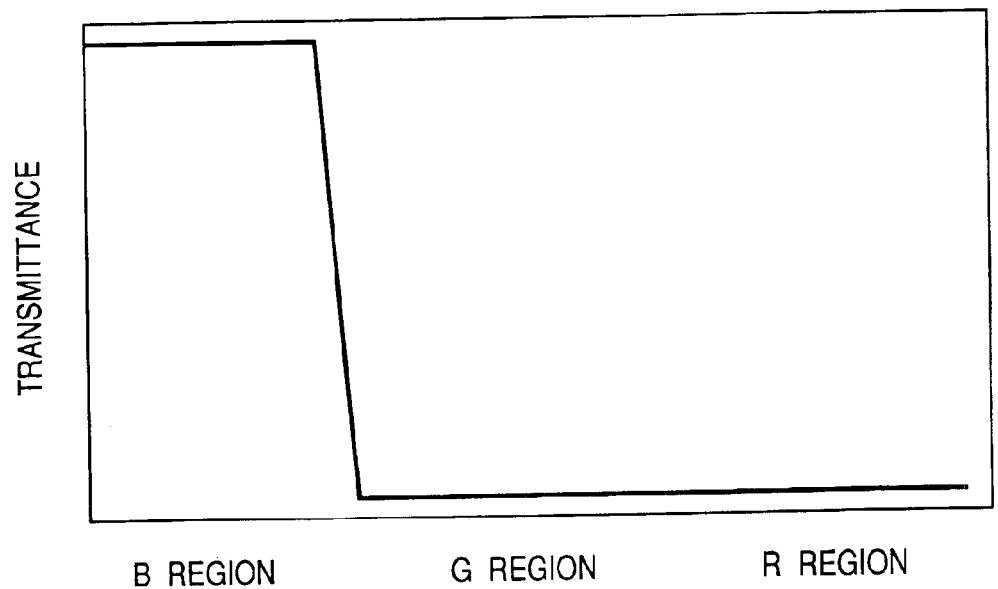
FIG. 8 is a characteristic diagram of spectral transmittance of a fourth dichroic mirror employed in the embodiment 1 of the present invention.

As to the leakage light of the B light bundle, as mentioned above, the original P-polarization component is only the light flux reflected by the polarization separating surface 401 of the first polarizing beam splitter 40 as shown in FIG. 6.

Figure 9:
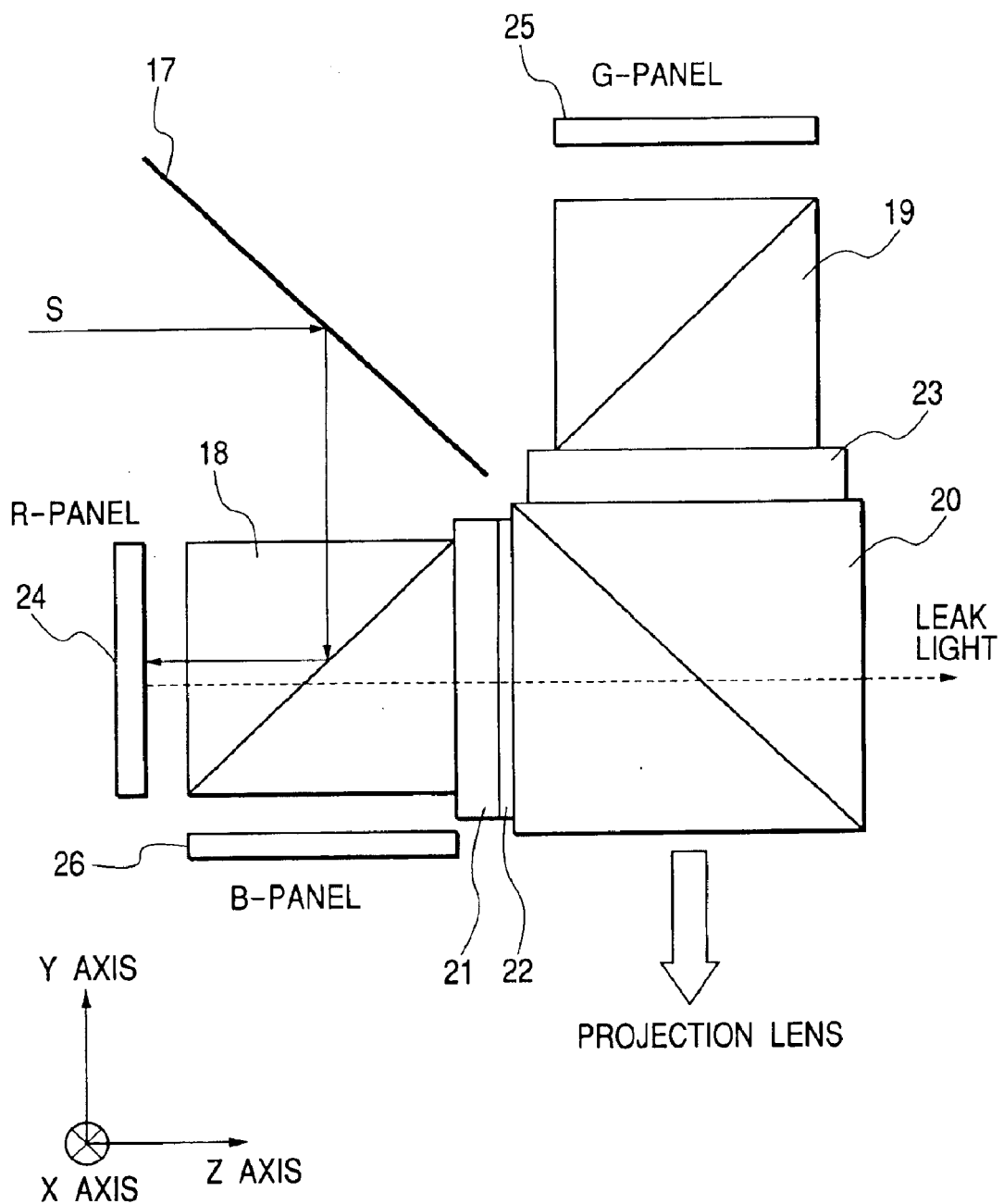
FIG. 9 is a diagram showing the operation of a color separation/synthesis system with respect to leakage light of the B light bundle, which is employed in the first embodiment of the present invention.
Figure 10:
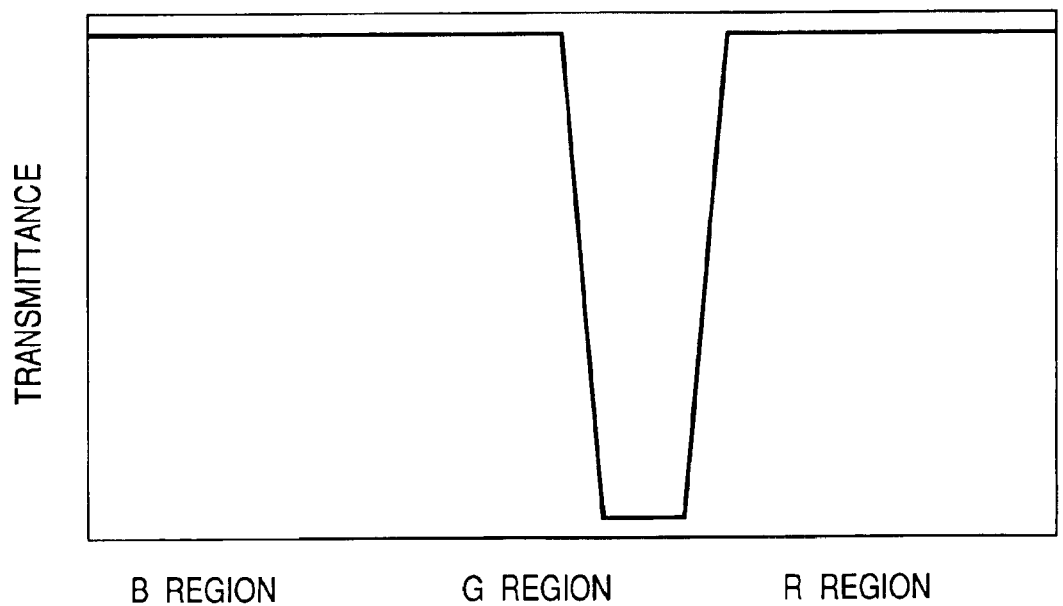
FIG. 10 is a characteristic diagram of spectral transmittance of a third dichroic mirror employed in the first embodiment of the present invention.

The operation of a color separation/synthesis system with respect to the P-polarized light used as the leakage light of the B light bundle will be explained using FIG. 9.

A light flux emitted from the polarized-light converting means 4 as P-polarized light is turned into S-polarized light for the color separation/synthesis system. The S-polarized light used as the leakage light of the B light bundle is reflected by a sixth dichroic mirror 17 for reflecting the B light bundle and then reflected by a polarization separating surface of a polarizing beam splitter 18, followed by being incident on a reflection type light valve 24 for R. The light reflected from the reflection type light valve 24 makes a substitute of its polarized state in an ON state to thereby turn into P-polarized light. Therefore, the light penetrates the polarization separating surface of the polarizing beam splitter 18 this time. Further, it penetrates a flat plate glass 21 and a partial polarization rotating element 22 for rotating a polarized state of R light by P-polarization and S-polarization, and penetrates a polarization separating surface of a polarizing beam splitter 20, followed by being outputted to the right side as viewed in the drawing. Therefore, no problem occurs.

In the above description, the leakage light at the first polarizing beam splitter 40 and the leakage light at the second polarizing beam splitter 41 have been explained separately as the leakage light of the B light bundle. Although a combination leakage light at the first polarizing beam splitter 40 and that at the second polarizing beam splitter 41, and a combination with leakage light of other optical elements are also conceivable as a matter of course except for the above, leakage light at a plurality of optical elements show no problem in practice in terms of the fact that ① the entrance of light fluxes obtained by inverting the P-polarized light and S-polarized light into the reflection light valve is the cause of contrast degradation and ② the extinction ratio of the polarization separating surface itself has a value exceeding 1000:1 for reference incidence.

A basic configuration of the polarized-light converting means 4 and the operations of the polarized-light converting means 4 and color separation/synthesis system with respect to the R and G light bundles will be explained using FIGS. 10 through 15.

As previously mentioned in FIG. 1, the R light bundle and the G light bundle penetrate the first dichroic mirror 1 and are reflected by the total reflection mirror 2 and the total reflection mirror 3, followed by being launched into the polarized-light converting means 4. As mentioned in FIG. 3, the third dichroic mirror 43 is disposed at the incident opening for the R and G light bundles, of the polarized-light converting means 4. The third dichroic mirror 43 is caused to have a spectral transmittance characteristic shown in FIG. 10 as the action of causing no penetration of a light flux in a wavelength band between the G and R light bundles. This reason is as follows: The third dichroic mirror is an optical element for cutting a luminescent line (high in energy) of a light source 11, lying in about 580 nm between the G light bundle and the R light bundle. Unless the luminescent line is cut, the white color results in yellowish eye color.

Optical paths of the R light bundle/G light bundle of the P-polarized light and the R light bundle/G light bundle of the S-polarized light will next be described using FIG. 11. A P-polarization component of the R light bundle/G light bundle passes through the third dichroic mirror 43 and penetrates the polarization separating surface 401 of the first polarizing beam splitter 40 after which it is outputted to the right side as viewed in the drawing as the P-polarized light as it is.

An S-polarization component of the R light bundle/G light bundle passes through the third dichroic mirror 43. Thereafter, it is reflected by the polarization separating surface 401 of the first polarizing beam splitter 40 and enters the second polarizing beam splitter 41. Similarly, it is reflected even by the polarization separating surface 411 of the second polarizing beam splitter 41 and passes through the ¼-wave plate 412, followed by entering the fourth dichroic mirror 44. Meanwhile, the spectral transmittance characteristic of the fourth dichroic mirror 44 is caused to have a spectral transmittance characteristic in which the R light bundle/G light bundle is reflected as previously shown in FIG. 8. The R light bundle/G light bundle is reflected by the fourth dichroic mirror 44 and passes through the ¼-wave plate 412 again. Since the ¼-wave plate 412 has a polarization axis in a 45° direction, it penetrates the ¼-wave plate 412 twice back and forth. Consequently, the ¼-wave plate 412 has an operation identical to the ½-wave plate, i.e., the action of converting S-polarized light to P-polarized light. Thus, the R light bundle/G light bundle penetrates the polarization separating surface 411 of the second polarizing beam splitter 41 this time and is outputted to the right side as viewed in the drawing as the P-polarized light. That is, the R light bundle/G light bundle is all turned into the P-polarized light, which in turn is outputted from the polarized-light converting means 4.

The operation of a color separation/synthesis system with respect to the R light bundle/G light bundle emitted from the polarized-light converting means 4 will next be described using FIG. 12.

Figure 11:
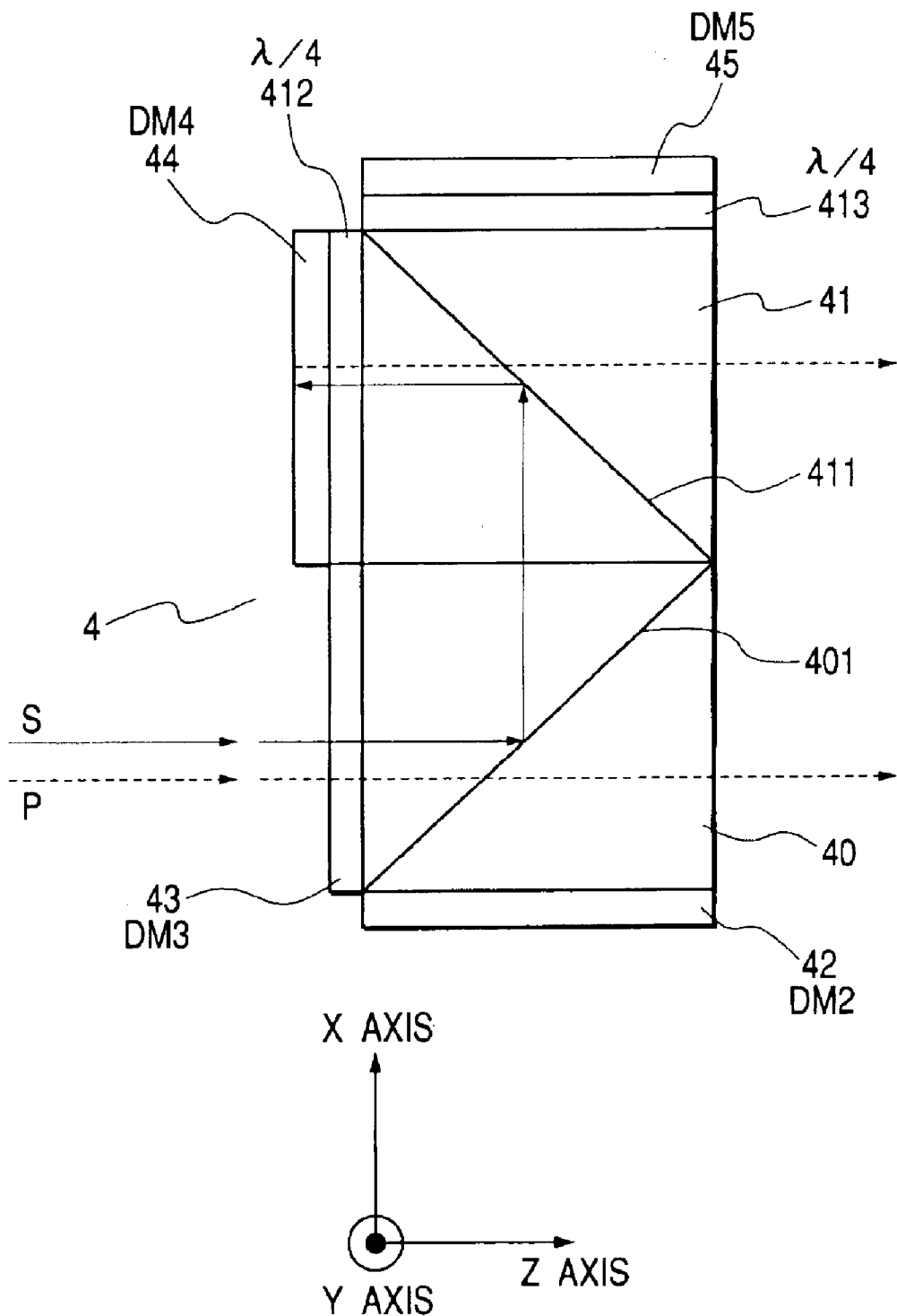
FIG. 11 is a diagram illustrating the operation of the polarized-light converting means according to the first embodiment of the present invention with respect to an R light bundle and a G light bundle.
Figure 12:
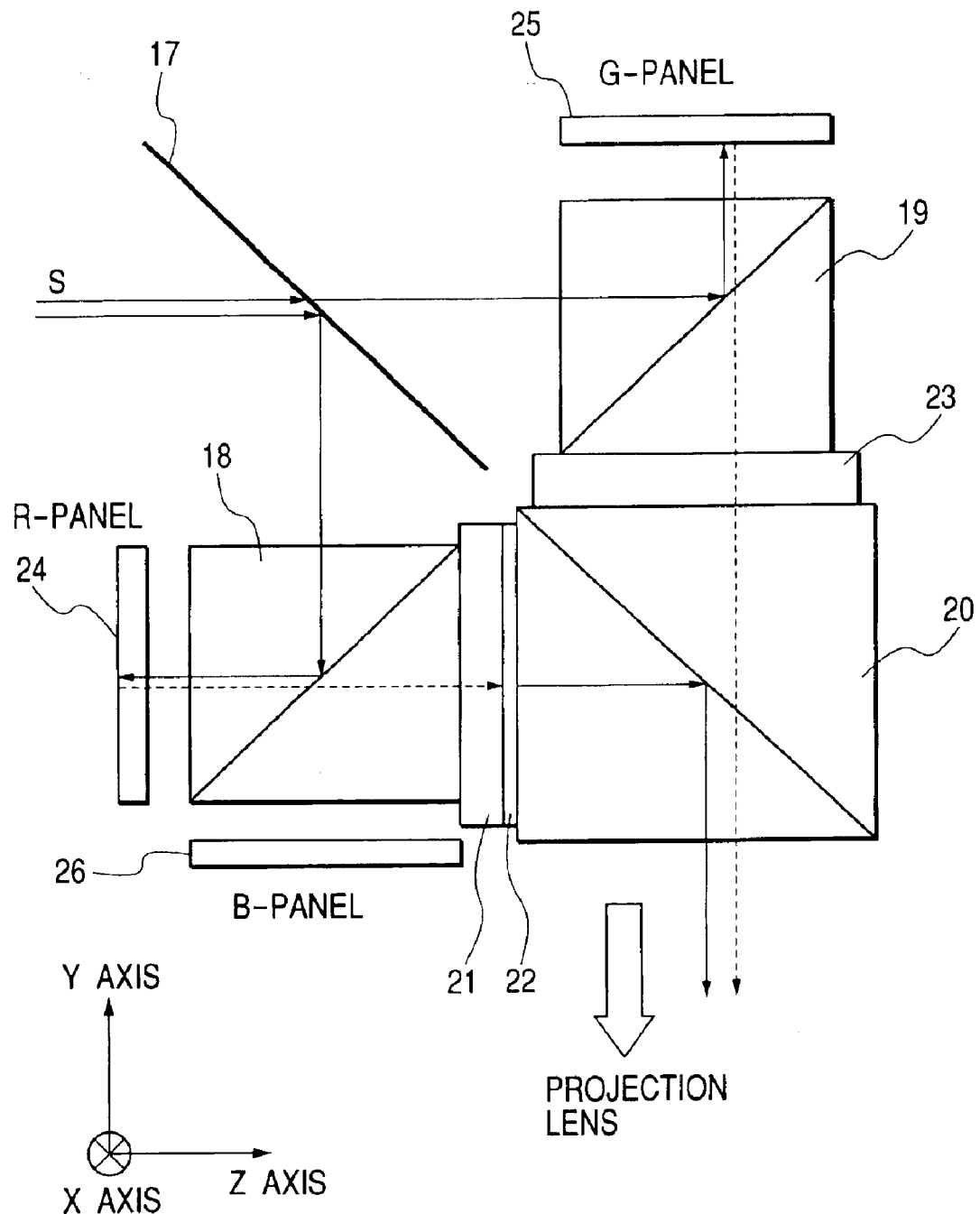
FIG. 12 is a diagram showing the operation of the color separation/synthesis system with respect to the R light bundle and G light bundle, which is employed in the first embodiment of the present invention.

As previously described in the case of the B light bundle, the R light bundle/G light bundle emitted as the P-polarized light from the polarized-light converting means 4 shown in FIG. 11 is launched into the color separation/synthesis system of FIG. 12 as S-polarized light.

The R light bundle corresponding to the S-polarized light is reflected by a sixth dichroic mirror 17 and then reflected by a polarization separating surface of a polarizing beam splitter 18, followed by being incident on a reflection type light valve 24 for R. The light reflected from the reflection type light valve 24 makes a substitute of its polarized state in an ON state to thereby turn into P-polarized light. Therefore, the light penetrates the polarization separating surface of the polarizing beam splitter 18 and a flat plate glass 21 this time. Next, it penetrates a partial polarization rotating element 22 for rotating a polarized state of R light by P-polarization and S-polarization. The R light bundle brought to the S-polarized light is reflected by a polarization separating surface of a polarizing beam splitter 20, following by being launched into a projection lens (not shown).

Similarly, the G light bundle corresponding to the S-polarized light penetrates the sixth dichroic mirror 17 and is thereafter reflected by a polarization separating surface of a polarizing beam splitter 19, followed by being launched into a reflection type light valve 25 for G. The light reflected from the reflection type light valve 25 makes a substitute of its polarized state in an ON state to thereby turn into P-polarized light. Therefore, the light penetrates the polarization separating surface of the polarizing beam splitter 19, a plate glass 23 and the polarization separating surface of the polarizing beam splitter 20, followed by being launched into a projection lens (not shown).

Figure 13:
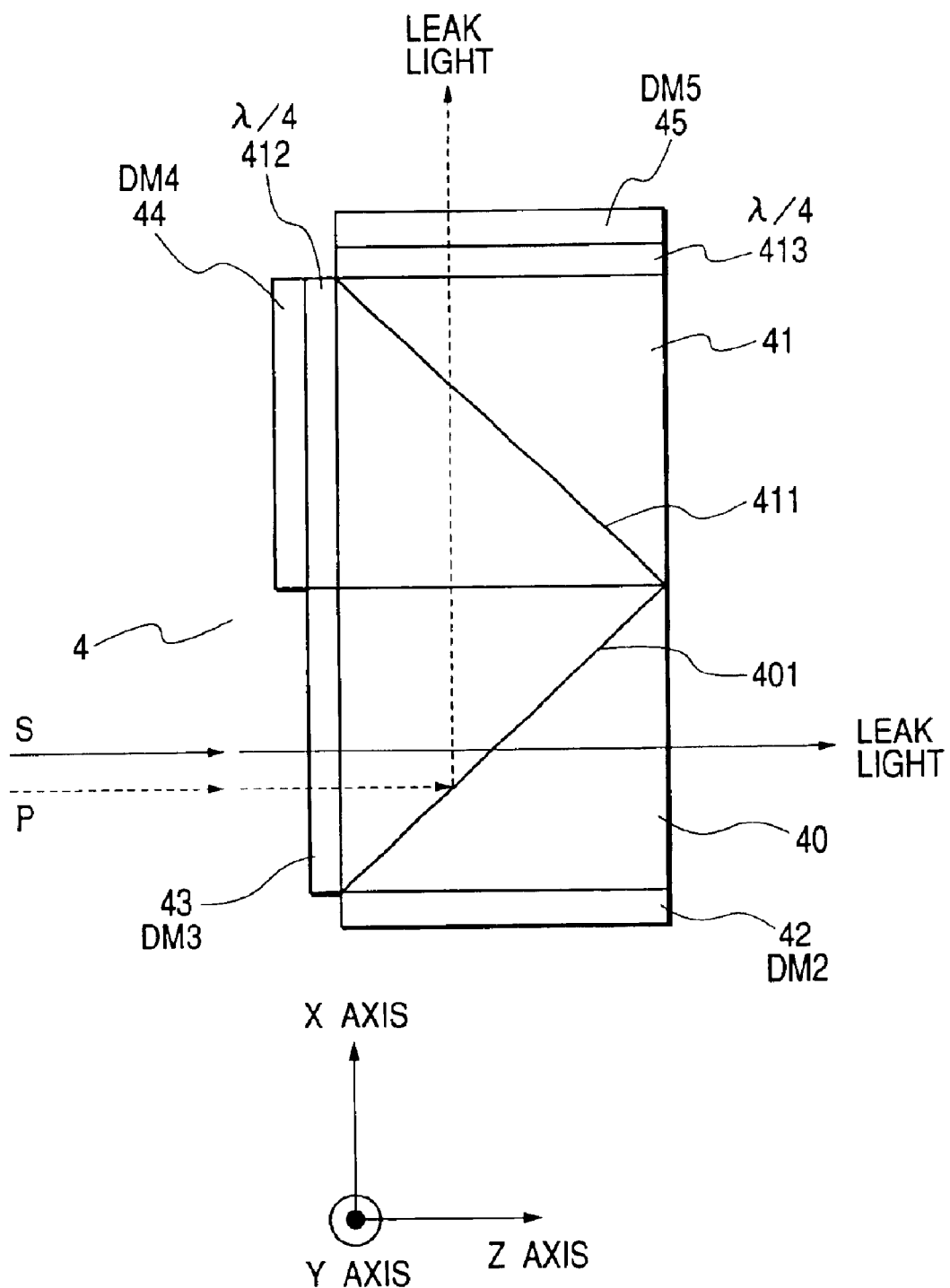
FIG. 13 is a diagram illustrating the operation of the polarized-light converting means with respect to leakage light of the R and B light bundles at the first polarizing beam splitter employed in the first embodiment of the present invention.
Figure 14:
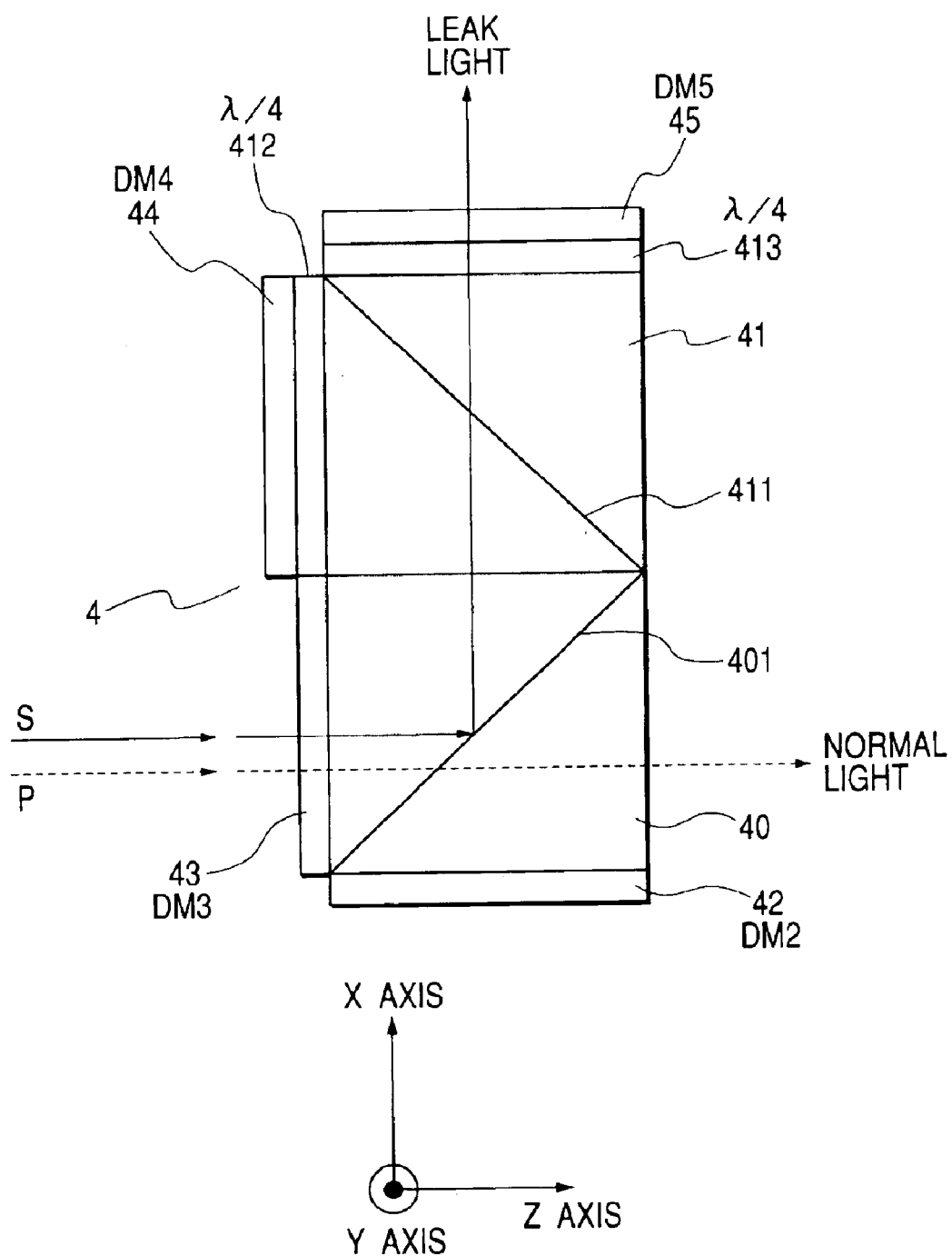
FIG. 14 is a diagram showing the operation of the polarized-light converting means with respect to leakage light of R and G light bundles at the second polarizing beam splitter employed in the first embodiment of the present invention.
Figure 15:
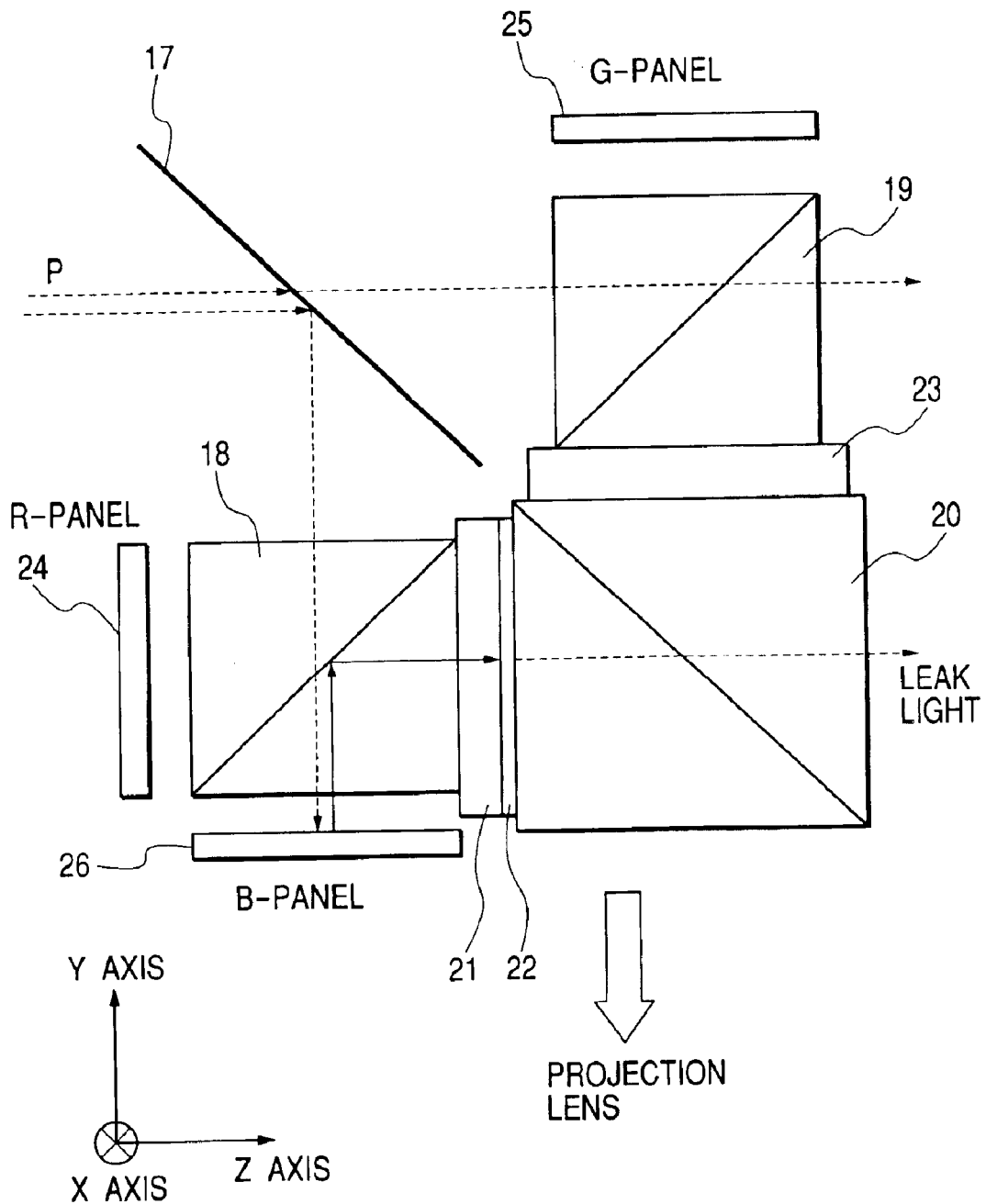
FIG. 15 is a diagram illustrating the operation of the color separation/synthesis system according to the first embodiment of the present invention with respect to leakage light of R and B light bundles.

Leakage light of R light bundle/G light bundle of polarized-light converting means 4 will next be described using FIGS. 13 through 15.

The leakage light of the R light bundle/G light bundle at a polarization separating surface 401 of a first polarizing beam splitter 40 will first be described using FIG. 13.

The leakage light corresponding to P-polarized light of the R light bundle/G light bundle at the first polarizing beam splitter 40 is reflected by the polarization separating surface 401 of the first polarizing beam splitter 40 and enters a second polarizing beam splitter 41. Since the leakage light is of the P-polarized light, it penetrates a polarization separating surface 411 of the second polarizing beam splitter 41 and penetrates a ¼-wave plate 413, followed by being launched into a fifth dichroic mirror 45. The fifth dichroic mirror 45 is caused to have a spectral transmittance characteristic allowing the R light bundle/G light bundle to pass as previously described in FIG. 4. Since the R light bundle/G light bundle penetrates the fifth dichroic mirror 45 and is outputted upward as viewed in the drawing, no problem occurs.

The leakage light of the R light bundle/G light bundle at the polarization separating surface 411 of the second polarizing beam splitter 41 will next be described using FIG. 14.

S-polarized light of R light bundle/G light bundle reflected by a polarization separating surface 401 of a first polarizing beam splitter 40 is reflected by the polarization separating surface 411 of the second polarizing beam splitter 41 but the leakage light penetrates the polarization separating surface 411. The leakage light penetrates a ¼-wave plate 413 and a fourth dichroic mirror 45 in a manner similar to the previous description and is outputted upward as viewed in the drawing. Therefore, no problem arises.

That is, the S-polarized light corresponding to the leakage light at the polarization separating surface 401 of the first polarizing beam splitter 40 is outputted from the polarized-light converting means 4 as the leakage light of the R light bundle/G light bundle.

The operation of a color separation/synthesis system with respect to the leakage light of the R light bundle/G light bundle emitted from the polarized-light converting means 4 will next be explained using FIG. 5.

A light flux or bundle emitted from the polarized-light converting means 4 as the S-polarized light turns into P-polarized light for the color separation/synthesis system. The P-polarized light used as the leakage light of the R light bundle is reflected by a sixth dichroic mirror 17 for reflecting the R light bundle and then penetrates a polarization separating surface of a polarizing beam splitter 18, followed by being incident on to a reflection type light valve 26 for B. The light reflected from the reflection type light valve 26 makes a substitute of its polarized state in an ON state to thereby turn into S-polarized light. Therefore, the light penetrates the polarization separating surface of the polarizing beam splitter 18 and a plate glass 22 this time. Next, it penetrates a partial polarization rotating element 22 for rotating a polarized state of R light by P-polarization and S-polarization to turn into P-polarized light. Since the light penetrates a polarization separating surface of a polarizing beam splitter 20 and is outputted to the right side as viewed in the drawing, no problem occurs.

On the other hand, since the P-polarized light used as the leakage light of the G light bundle penetrates the sixth dichroic mirror 17 for allowing the G light bundle to pass, penetrates a polarization separating surface of a polarizing beam splitter 19 and is outputted to the right side as viewed in the drawing, no problem occurs.

Figure 17:
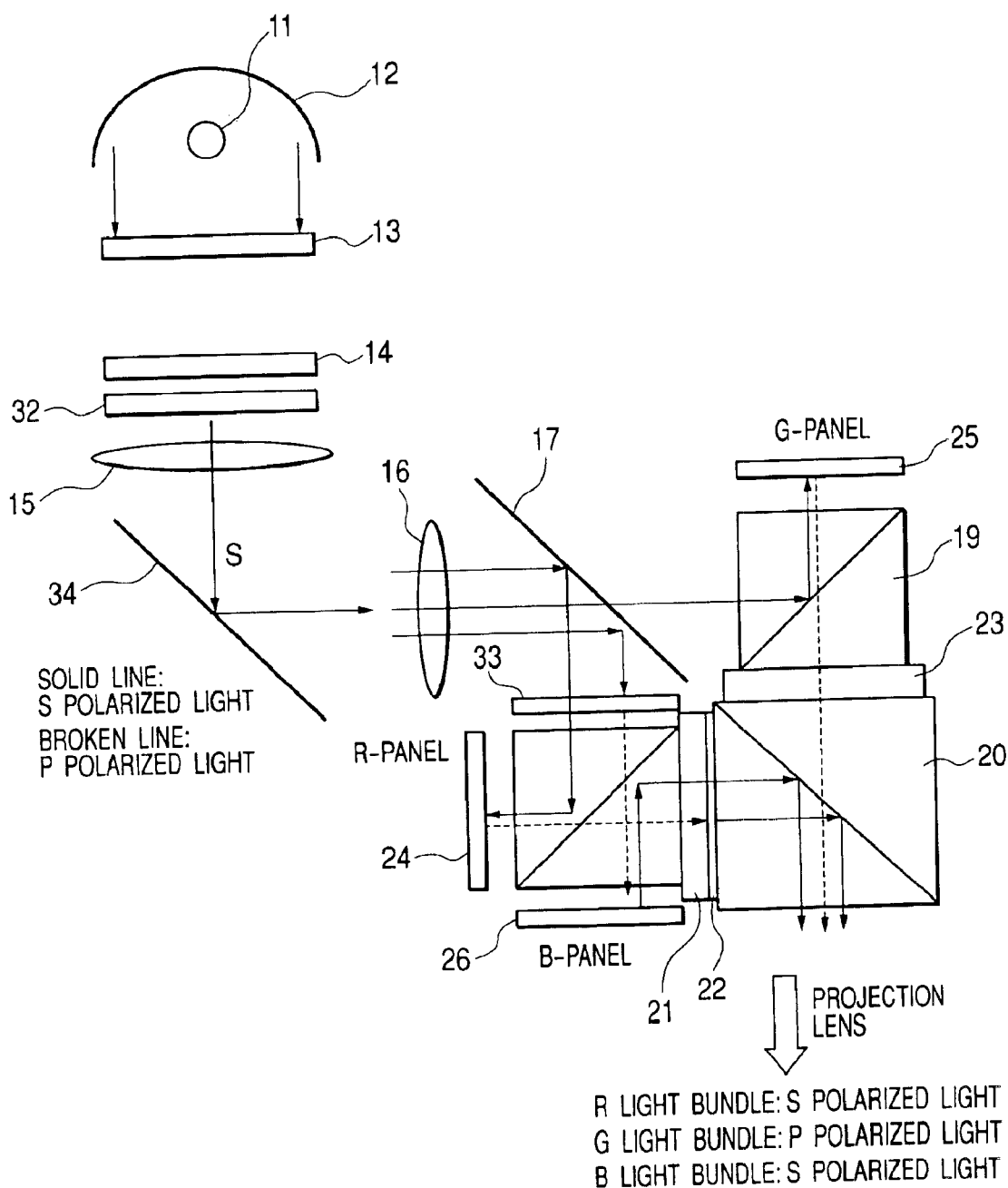
FIG. 17 is a configurational diagram of a conventional illumination optical system using a flat plate type polarized-light converting means and a color separation/synthesis system.

While the polarized-light converting means 4 and the color separation/synthesis system have been described above, an advantageous effect is brought about in that since the B light corresponding to the S-polarized-light and the R light/G light corresponding to the P-polarized light emitted from the polarized-light converting means are different in polarizing direction from each other, and they respectively turn into the B light corresponding to the P-polarized light and the R light/G light corresponding to the S-polarized light at the entrance or inlet of the color separation/synthesis system, there is no need to provide the partial polarization rotating element 33 for separating the R light and B light by the color separation/synthesis system described in FIG. 17. Since one sheet of a partial polarization rotating element disposed at a position close to a light source and high in temperature can be removed, high reliability/long-lived achievement can be realized.

Figure 16:
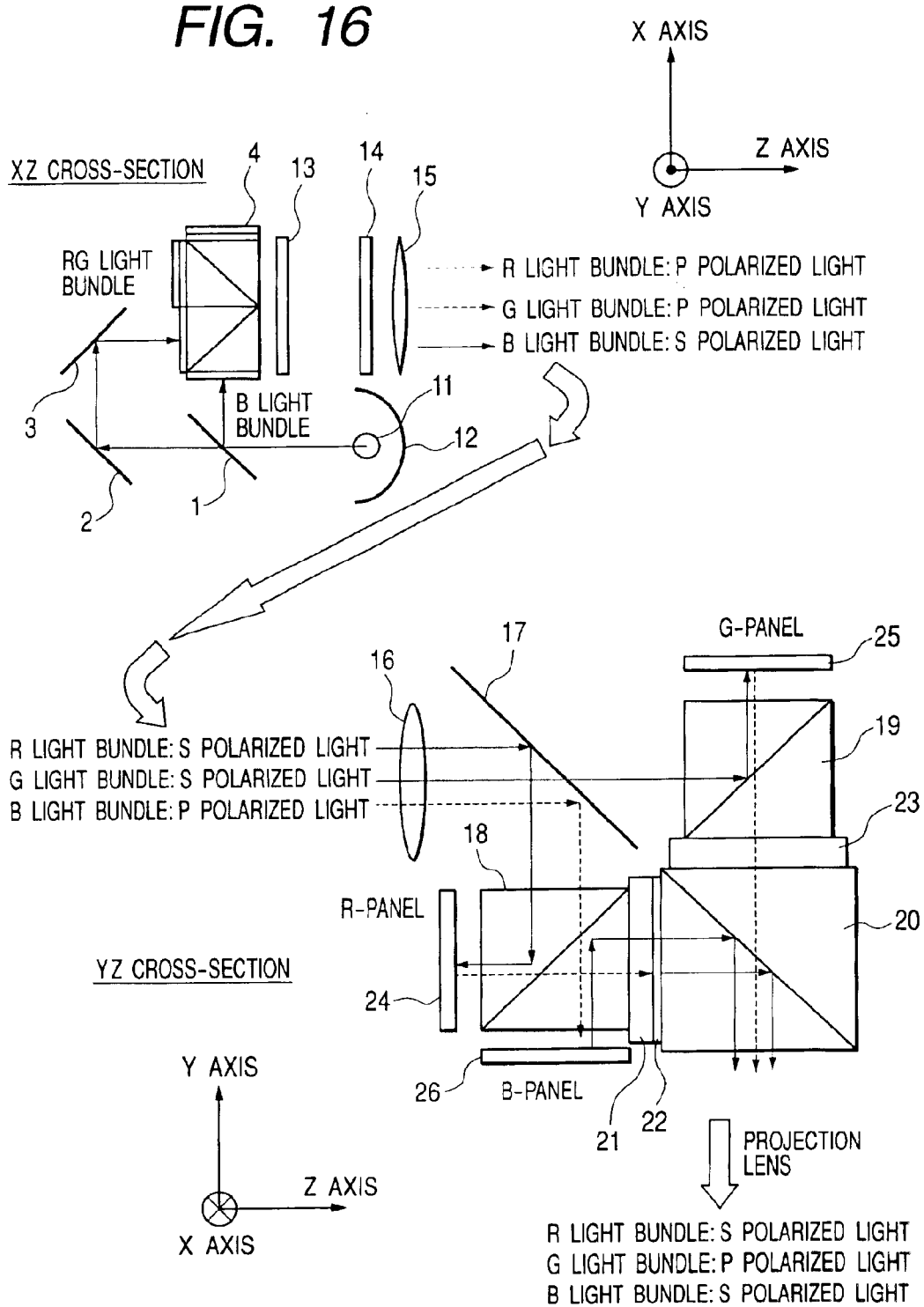
FIG. 16 is a configurational diagram of an illumination optical system using the polarized-light converting means according to the first embodiment of the present invention and the color separation/synthesis system employed therein.

FIG. 16 is a configurational diagram of a liquid crystal projector using polarized-light converting means and a color separation/synthesis system according to an embodiment of the present invention. In FIG. 16, portions having functions common to those in the above drawings are respectively identified by the same reference numerals, and the description of their common functions will be omitted.

Referring to FIG. 16, a light flux or bundle emitted from the light source 11 is reflected by a reflector 12 having a parabolic shape to turn into a light bundle parallel to an optical axis. The white light bundle parallel to the optical axis is color-separated into a B light bundle and an R light bundle/G light bundle by a first dichroic mirror 1. While the b light bundle is reflected by the first dichroic mirror 1, the transmitted R light bundle/G light bundle passes through a total reflection mirror 2 and a total reflection mirror 3 and enters the polarized-light converting means 4 through different openings. The B light bundle aligned to S-polarized light by the polarized-light converting means 4 and the R light bundle/G light bundle aligned to P-polarized light thereby are divided into a plurality of light bundles by a lens array type integrator comprising a first multilens array 13 and a second multilens array 14, which in turn are converged or gathered by a focusing lens 15 and then brought into telecentric light bundles by a condenser lens 16, after which they are launched into the color separation/synthesis system according to the present invention described in FIGS. 5 and 12.

The B light bundle aligned to the S-polarized light by the polarized-light converting means 4 is launched into the color separation/synthesis system as P-polarized light, and the R light bundle/G light bundle aligned to the P-polarized light is launched therein as S-polarized light, after which their color separation and synthesis are performed by the color separation/synthesis system. The color-separated light bundles are respectively subjected to optical strength modulation on reflection type light valves 24, 25 and 26, so that optical images are formed. The optical images of the respective light bundles are combined together, which in turn are outputted or emitted from the color separation/synthesis system and enlarged by an unillustrated projection lens, followed by being projected on the screen not shown.

In the present invention, as described above, a polarized-light converting means is realized which greatly reduces leakage light and is excellent in contrast performance. It is possible to remove a partial polarization rotating element disposed on a side close to a light source, that is, high in temperature, from a color separation/synthesis system simultaneously with the above realization. A projector device, which is excellent in contrast performance and provides high reliability/long living, can therefore be realized as the liquid crystal projector using the polarized-light converting means and the color separation/synthesis system according to the present invention.

Although the B light bundle color-separated by reflecting the white light emitted from the light source by the first dichroic mirror 1 is launched from the incident plane on the lower side as viewed in FIG. 1 to the polarized-light converting means 4 shown in FIG. 1, and the R light bundle/G light bundle transmitted through the first dichroic mirror 1 is launched from the incident plane on the left side as viewed in the figure to the polarized-light converting means 4 in the above-described embodiment, the present invention is not limited to it.

The polarized-light converting means of the present invention has a feature in that white light emitted from a light source is color-separated into two colors by a first dichroic mirror, and different color light bundles are launched from different incident planes to the polarized-light converting means.

Thus, for instance, the R light bundle/G light bundle is reflected by the first dichroic mirror, and the B light bundle is transmitted therethrough and subjected to color separation, after which they may be launched into the polarized-light converting means. Thus, a second embodiment will be shown in FIG. 18, wherein white light emitted from a light source is color-separated into the two colors by an R light bundle/G light bundle reflection and B light bundle penetration type first dichroic mirror, which in turn are launched into polarized-light converting means.

Figure 18:
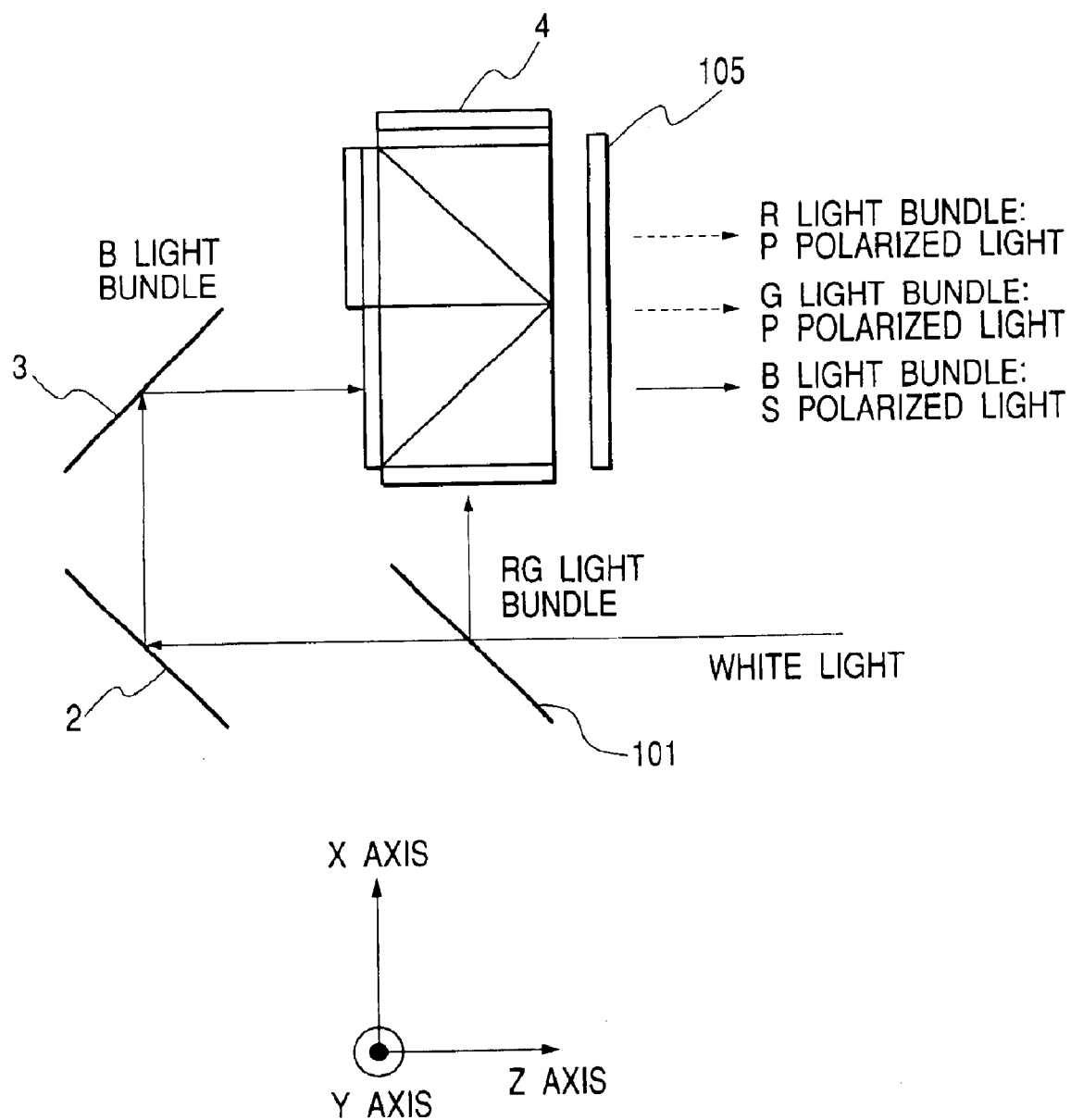
FIG. 18 is a diagram showing a second embodiment of a polarized-light converting means for color-separating a B light bundle into two colors by a first dichroic mirror for reflecting R and G light bundles and causing the B light bundle to pass therethrough.

In FIG. 18, an R light bundle/G light bundle of the white light emitted from a light source is reflected by an R light bundle/G light bundle reflection and B light bundle penetration type first dichroic mirror 101 and launched into a polarized-light converting means 4 from the lower side as viewed in the drawing. The B light bundle of the white light, which has penetrated the first dichroic mirror 101, is reflected by total reflection mirrors 2 and 3, followed by entering into the polarized-light converting means 4 from the left side as viewed in the drawing. Since the light bundles color-separated into the two colors in contrast to FIG. 1 are launched into the polarized-light converting means 4, the R light bundle/G light bundle corresponding to S-polarized light, and the B light bundle corresponding to P-polarized light are emitted from a first polarizing beam splitter 40 and a second polarizing beam splitter 41 of the polarized-light converting means 4. When the polarized-light converting means 4 is now combined with the color separation/synthesis system shown in each of FIGS. 5 and 16, a ½-wave plate 105 is provided on the outgoing side of the polarized-light converting means 4 to align two-color polarizing directions with FIG. 1 to thereby convert the R light bundle/G light bundle from the S-polarized light to the P-polarized light and convert the B light bundle to S-polarized light, after which they may be outputted. Although not described in detail, it is also of course feasible to change the layout of reflection type light valves 24, 25 and 26 of a color separation/synthesis system and the direction of a projection lens and omit the ½-wave plate 105.

It is also apparent that as a matter of course, the white light emitted from the light source is separated into the two colors by using the first dichroic mirror for color-separating it into the R light bundle and the G light bundle/B light bundle, and they may be launched into the polarized-light converting means. A more detailed description is omitted.

According to the present invention, as described above, polarized-light converting means excellent in contract performance, and a liquid crystal projector device using it can be obtained.

What is claimed is:

1. A polarized-light converting unit comprising:
    a first polarizing beam splitter; and
    a second polarizing beam splitter,
    said first polarizing beams splitter and said second polarizing beam splitter being joined in a columned form or shaped in an integrated prism form;
    wherein said first polarizing beam splitter includes two incident planes on which two types of color light separated into color light of a specific wavelength band from white light and color light of the remaining wavelength band thereof from the white light are respectively incident, and
    said second polarizing beam splitter includes both a first ¼-wave plate and a first dichroic mirror, and a second ¼-wave plate and a second dichroic mirror different in wavelength characteristic from the first dichroic mirror, both of which are respectively disposed on two adjacent surfaces different from a junction surface with said first polarizing beam splitter and an outgoing surface thereof.

2. The polarized-light converting unit according to claim 1, wherein said first polarizing beam splitter and said second polarizing beam splitter include a first polarization separating surface and a second polarization separating surface, respectively, and
    the first polarization separating surface and the second polarization separating surface are perpendicular to each other and configured such that surfaces on the cross-line side in which the two surfaces intersect at right angles are defined as outgoing surfaces.

3. The polarized-light converting unit according to claim 1, wherein the first dichroic mirror is disposed on a first surface adjacent to the corresponding outgoing surface and has a characteristic that reflects first color light incident on a first incident plane adjacent to the outgoing surface.

4. The polarized-light converting unit according to claim 3, wherein the second dichroic mirror is disposed on a surface different from the first surface and has a characteristic that reflects a second color light incident on a second incident plane different from the first incident plane.

5. The polarized-light converting unit according to claim 4, wherein the first ¼-wave plate and the first dichroic mirror, and the second ¼-wave plate and the second dichroic mirror are respectively disposed on the first incident plane and the second incident plane in order of a ¼-wave plate and a dichroic mirror.

6. A projector comprising:
   a light source unit which irradiates white light;
   a plurality of reflection type light valves which modulate an illumination light bundle emitted from the light source unit;
   color separation/synthesis unit which separates color light for the reflection type light valves from the illumination light bundle and combines the color light after the reflection thereof by the reflection type light valves;
   a projection lens which projects images modulated by the reflection type light valves;
   color separating unit, placed in an optical path between the light source unit and the color separation/synthesis unit, which separates the white light emitted from the light source unit into two types of color light of a specific wavelength band thereof and the remaining wavelength band thereof; and
   a first polarizing beam splitter and a second polarizing beam splitter on which the two types of color light separated by said color separating unit are respectively incident from different incident planes, and which are joined in a columned form or shaped in an integrated prism form;
   wherein said first polarizing beam splitter includes two incident planes on which the two types of color light separated into the color light of the specific wavelength band from the white light and the color light of the remaining wavelength band thereof from the white light are respectively incident, and
   said second polarizing beam splitter is provided with both a first ¼-wave plate and a first dichroic mirror, and a second ¼-wave plate and a second dichroic mirror different in wavelength characteristic from the first dichroic mirror, both of which are respectively disposed on two adjacent surfaces different from a junction surface with said first polarizing beam splitter and an outgoing surface thereof.

7. The projector according to claim 6, wherein said color separating unit has a dichroic function of reflecting first color light and causing second color light and third color light to pass with respect to the white light comprised of the first color light, the second color light and the third color light corresponding to the three primary colors of incident light.

8. The projector according to claim 6, wherein said color separating unit has a dichroic function of reflecting first color light and second color light and causing third color light to pass with respect to the white light comprised of the first color light, the second color light and the third color light corresponding to the three primary colors of incident light.

9. The projector according to claim 6, wherein a separating direction of a polarization separating surface of said first polarizing beam splitter and said second polarizing beam splitter as seen from said color separation/synthesis unit and a separating direction of a polarization separating surface of said color separation/synthesis unit are placed in an orthogonal relationship.

10. The projector according to claim 6, wherein a direction of separation of said color separation/synthesis unit and a direction of each short side of said each reflection type light valve are placed in a positional parallel relationship.

11. The projector according to claim 6, wherein a first multilens array and a second multilens array constituted as an integrator, a focusing lens for superimposing an amount-of-light distribution of each lens cell of the first multilens array on the surface of said each reflection type light valve, and a condenser lens used as a field lens for bringing the light bundles incident on the reflection type light valves into telecentric form are provided in an optical path between the polarized-light converting unit and the reflection type light valves.

12. The projector according to claim 6, wherein said first polarizing beam splitter and said second polarizing beam splitter include a first polarization separating surface and a second polarization separating surface, respectively, and
   the first polarization separating surface and the second polarization separating surface are perpendicular to each other and configured such that surfaces on the cross-line side in which the two intersect at right angles are defined as outgoing surfaces.

13. The projector according to claim 6, wherein the first dichroic mirror is disposed on a first surface adjacent to the corresponding outgoing surface and has a characteristic that reflects a first color light incident on a first incident plane adjacent to the outgoing surface.

14. The projector according to claim 13, wherein the second dichroic mirror is disposed on a surface different from the first surface and has a characteristic that reflects second color light incident on a second incident plane different from the first incident plane.

15. The projector device according to claim 14, wherein the first ¼-wave plate and the first dichroic mirror, and the second ¼-wave plate and the second dichroic mirror are respectively disposed on the first incident plane and the second incident plane in order of a ¼-wave plate and a dichroic mirror.

* * * * *